United States Patent
Couland et al.

(10) Patent No.: US 6,253,230 B1
(45) Date of Patent: Jun. 26, 2001

(54) DISTRIBUTED SCALABLE DEVICE FOR SELECTING A SERVER FROM A SERVER CLUSTER AND A SWITCHED PATH TO THE SELECTED SERVER

(75) Inventors: Ghislaine Couland, Nice (FR); Guerney Douglass Holloway Hunt, Yorktown Heights, NY (US); Eric Michel Levy-Abegnoli; Daniel Georges Jean-Marie Mauduit, both of Nice (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/158,159

(22) Filed: Sep. 22, 1998

(51) Int. Cl.[7] .................................................. G06F 15/16
(52) U.S. Cl. ........................... 709/203; 709/202; 709/227
(58) Field of Search .................................... 709/226, 227, 709/228, 203, 202, 230, 232, 238, 239, 242, 105; 370/354, 353, 351, 352, 357

(56) References Cited

U.S. PATENT DOCUMENTS

| | | | |
|---|---|---|---|
| 5,371,852 | 12/1994 | Attanasio et al. | 395/200 |
| 5,694,547 | * 12/1997 | Subramanian et al. | 709/228 |
| 5,774,660 | * 6/1998 | Brendel et al. | 709/203 |
| 5,828,666 | * 10/1998 | Focsaneanu et al. | 370/351 |
| 5,918,017 | * 6/1999 | Attanasio et al. | 709/242 |
| 6,067,545 | * 5/2000 | Wolff | 709/226 |
| 6,067,580 | * 5/2000 | Aman et al. | 709/105 |

FOREIGN PATENT DOCUMENTS

| | | |
|---|---|---|
| 8-107422 | 4/1996 | (JP) . |
| 9-116538 | 5/1997 | (JP) . |
| 9-233086 | 9/1997 | (JP) . |
| 10-13533 | 1/1998 | (JP) . |

OTHER PUBLICATIONS

Multi Layer Routing, http:/infonet.aist–nara.ac.jp/member/nori–d/mlr/, "Multi Layer Routing—Integration of Layer 2 and Layer 3—", Jun. 10, 1998, 11 Pages.

Memo, Network Working Group, Request for Comments: 2333, Category: Standards Track, "NHRP Protocol Applicability Statement", D. Cansever, Copyright © The Internet Society (1998), 11 Pages.

(List continued on next page.)

*Primary Examiner*—Robert B. Harrell
*Assistant Examiner*—Marc D. Thompson
(74) *Attorney, Agent, or Firm*—Scully, Scott, Murphy & Presser; Gail H. Zarik, Esq.

(57) ABSTRACT

A method and system for building scaleable TCP/IP services such as a cluster web server out of a switch or switched network such as an ATM switch or ATM switched network. For example, a distributed large scale TCP router can be built using an ATM switch network. The scaled services can be presented as a single service to clients. The scaleable services can balance the load on the individual servers in the cluster. The clients can be directly or indirectly connected to the switch or switched network. One version includes two separate components: a Control Engine (CE); and a Forwarding Engine (FE). The Control Engine is in charge of assigning a connection to a server and forwarding information about the assigned server and connection to the Forwarding Engine. The Forwarding Engine applies the assignments received from the Control Engine to map a TCP connection onto a switched ATM connection. At the end, the Forwarding Engine communicates the connection termination event back to the Control Engine. A preferred embodiment takes advantage of the switched nature of ATM networks to shortcut paths from clients to servers, wherever possible. Using ATM shortcuts can increase performance by several order of magnitude, while providing efficient distribution of the load balancing function.

26 Claims, 12 Drawing Sheets

OTHER PUBLICATIONS

Memo, Network Working Group, Request for comments: 2335, Category: Standards Track, J. Luciani, Bay network, "A Districtured NHRP Service Using SCSP", Copyright © The Internet Society (1998), 9 Pages.

Paul Reilly, MSD Marketing, white paper, PDH, "Broadband ISDN, ATM, and all That: A Guide to Modern WAN Networking, and How it Evolved.", Silicon Graphics Computer Systems, ©Copyright 1994, 69 Pages.

Douglas E. Comer, Third Edition, Internetworking with TCP/IP, vol. 1, "Principles, Protocols, and Architecture", Prentice Hall, pp. 303–323, 1995.

Nortel ATM Tutorial, NORTEL Northern Telecom, "Asynchronous Transfer Mode (ATM) Tutorial", http://www.webproforum.com/nortel2/index.htm1, Jun. 10, 1998, 32 pages.

Memo, Network Working Group, Request for Comments: 2332, Category: Standards Track, "NBMA Next Hop Resolution Protocol (NHRP)", Luciani, et al, Apr. 1998, 52 pages.

Watanabe et al.; "ATM–based cut–through forwarding engine for computer communication networks"; NTT Optical Network System Labs; IEEE Global Telecommunications Conference, 1997; ISBN:0–7803–4198–8, Nov. 1997.*

* cited by examiner

DISTRIBUTED SCALABLE DEVICE FOR SELECTING A SERVER FROM A SERVER CLUSTER AND A SWITCHED PATH TO THE SELECTED SERVER

BACKGROUND

The Internet Engineering Task Force (IETF) Internetworking over NBMA (non-broadcast multiple access) (ION) working group is currently studying three different proposals for Internet Protocol (IP) Switching. These architectures can be summarized by two methods: an "Ipsilon" switching method associates Asynchronous Transfer Mode (ATM) connections to Internet Protocol flows; and a second that associates connections to egress routers routes.

ATM is well known in the art. By way of overview, ATM has its history based in the development of Broadband Integrated Services Digital Network (B-ISDN). ATM is a method of multiplexing and switching packets that has been chosen as the transmission mode of B-ISDN. ATM, a transfer mode for high-speed digital transmission uses a packet switching technology and has nothing to do with "asynchronous" transmission (see e.g., "PDH, Broadband ISDN, ATM and All That: A guide to Modern WAN Networking, and How It Evolved," by Paul Reilly, Silicon Graphics Inc. (Apr. 4, 1994), which is hereby incorporated herein by reference in its entirety. ATM packets are called cells, wherein each cell has a 5 byte header and 48 bytes of data. ATM packet switching differs from conventional packet switching in that ATM packets follow pre-established routes called virtual paths and virtual circuits. Although ATM is not dependent on any particular physical medium of transmission, when the medium of transmission is mainly optical fibers, the error and loss rate is very small and hence no retransmission is done. See e.g., "Asynchronous Transfer Mode Tutorial," Northern Telecom, http://www.webproforum.com/nortel2/index.html, (Jun. 10, 1998), which is hereby incorporated herein by reference in its entirety.

The Transmission Control Protocol/Internet Protocol (TCP/IP) and the use of TCP/IP over ATM is also well known in the art. See e.g., D. E. Comer, *Internetworking with TCP/IP: Principles, Protocols, and Architecture,* Prentice Hall, Englewood Cliffs, N.J., (1988), which is hereby incorporated herein by reference in its entirety. Although Transmission Control Protocol (TCP) switching can work by allocating connections between the different ATM routers, e.g., using predefined Virtual Path Indicator/Virtual Channel Indicators (VPI/VCI), this method requires a given amount of packets to be exchanged per connection to be efficient. Another possible way to process is to use the Ipsilon IP switching method.

The traffic on the World Wide Web (Web) is increasing exponentially, especially at popular (hot) sites. Thus it is important to provide a scaleable web server (see for example, Goldszmidt, G. and Hunt, G. "Net Dispatcher a TCP Connection Router" IBM Research Report, 1997; and Dias, D. M., Kish, W., Mukheijee, R., and Tewari, R., "A Scalable and Highly Available Web Server", Proc. 41st IEEE Computer Society Intl. Conf. (COMPCON) 1996, Technologies for the Information Superhighway, pp. 85–92, February 1996. One known method to provide load balancing in a scaleable web server is to use a so-called Network Dispatcher [see e.g., U.S. Pat No. 5,371,852, issued Dec. 6, 1994 to Attanasio et al., entitled "Method and Apparatus for Making a Cluster of Computers Appear as a Single Host," which is hereby incorporated herein by reference in its entirety; and Attanasio, Clement R. and Smith, Stephen E., "A Virtual Multi-Processor Implemented by an Encapsulated Cluster of Loosely Coupled Computers", IBM Research Report RC 18442, (1992). Here, only the address of the Network Dispatcher (ND) is given out to clients; and the Network Dispatcher distributes incoming requests among the nodes in the cluster (also called a virtual encapsulated cluster (VEC)), either in a round-robin manner, or based on the load on the nodes. In co-pending U.S. patent application Ser. No. 08/861,749, filed May 22, 1997, entitled "A Method for Local and Geographically Distributed Load Balancing Using A Generalized TCP Router", by Dias et al., which is hereby incorporated herein by reference in its entirety, an example of a generalized Network Dispatcher is disclosed, that allows routing to nodes that may be located anywhere in a general inter-network.

The Internet backbone network is currently migrating to a switched ATM infrastructure. At the same time, very large servers (regardless whether they are a Mainframe, Mainframe clusters or other type of clusters) are being connected to the backbone via ATM links, to handle the dramatic growth in bandwidth and demands on throughput In that context, the IETF is considering various alternatives to take advantage of the simple/fast/efficient processing capabilities of ATM switches. What the various alternatives have in common is a dynamic scheme to simplify all intermediate hops (any hop but Client and Server) processing by replacing a routing decision based on an IP header, with a switching decision based on an ATM header. This means that, ultimately, only the endpoints (i.e., Clients and Servers) will process the IP packets (IP layer, TCP layer, etc.) while any other hop on the path between endpoints will switch ATM packets. Some of the alternatives are also considering a so-called "short-cut" method, which is a mechanism to bypass some of the intermediate hops, when physical connectivity allows it. The solutions considered by the Internet community include: the Next Hop Resolution Protocol (NHRP) (see e.g., "Next Hop Resolution Protocol (NHRP)", The Internet Society, Network Working Group, RFC 2332 (1998), which is hereby incorporated by reference in its entirety); the IPsilon IP Switching Protocols (IFMP and GSMP); Tag Switching; and IBM's Aggregate Route-based IP Switch (ARIS).

In a full or even partially switched network, a hop running a conventional front-end to a cluster of servers (such as the Network Dispatcher) would conflict with the entire innovative approach being studied by the IETF. It would have to examine the IP and TCP fields, while any other hop would be trying to avoid considering IP to make a routing decision.

SUMMARY

In accordance with the aforementioned needs, the present invention has features which provide a switching capability in a front-end to a cluster of servers so that packets can be switched up to the Server, and back to the client, or to the closest Switch to the client.

One version of the present invention includes two separate components: a Control Engine (CE); and a Forwarding Engine (FE). The Control Engine is in charge of assigning a connection to a server and forwarding information about the assigned server and connection to the Forwarding Engine. Each Forwarding Engine applies the assignments received from the Control Engine to map a TCP connection onto a switched ATM connection. At the end, the Forwarding Engine communicates the connection termination event back to the Control Engine.

An example of a method for selecting a server from a cluster of servers and a switched path to a selected server in a client-server system including a switched network, includes the steps of: a forwarding engine (FE) receiving a client request; the FE routing a request to a control engine (CE) to select a server from the cluster and a corresponding switched address, in response to the client request; the CE selecting a server and communicating the corresponding switched address to the FE; and the FE forwarding data associated with the client request to a selected server over a switched connection associated with the switched address, wherein the switched connection need not traverse the CE.

The step of the CE communicating the switched address to the FE may further include the step of, the CE communicating server selection criteria to the FE and conditions under which the FE may use the criteria; and for subsequent client requests received by the FE:

the FE determining if there is an existing switched connection associated with this request; and if there is an existing connection, the FE forwarding the request over the existing switched connection; and if there is no existing switched connection, the FE selecting the destination server locally, based on the criteria.

The present invention has other features which advantageously reduce the possibility of bottlenecks by minimizing the routing of packets through a centralized cluster front-end (also called cluster server or dispatcher) and distributing some of the routing function to the edge of the switched network. This method also enables the dispatcher to manage servers which are more than one hop away, and by distributing the forwarding processing, increases both robustness and performances of the entire system. For example, the FE could map a TCP connection onto a switched ATM connection based on the switched address. There could be provided a plurality of FEs remote to the CE wherein the FEs are distributed to the edge of the switched network and each FE distributes TCP connections under the direction of the CE. In another example, the plurality of distributed FEs can be connected to the CE via a switch fabric; and each distributed FE maps switched connections under the direction of the CE.

One embodiment of the present invention includes all the capabilities of existing TCP-connection routers, including high availability and fault tolerance. See for example, the commonly assigned co-pending U.S. patent application Ser. No. 08/929,409, entitled "Fault Tolerant Recoverable TCP/IP Connection Router," by Baskey et al., filed Sep. 15, 1997, IBM Docket No. YO997-232, which is hereby incorporated by reference in its entirety. Another embodiment includes one or more of the functions of existing TCP-connection type routers for feedback to balance the load across the cluster of servers.

An example of a method including features of fault tolerance in accordance with the present invention include a primary CE and a backup CE in the event that the primary CE fails. The method includes the steps of: detecting a primary CE failing; and the backup CE taking over for it and informing the FE that it is a new primary CE, in response to the failure detection.

Another example, including a plurality of FEs, includes the steps of: in response to the client request, using configuration information available in the network to configure one or more backup FEs that could be selected if a primary FE fails; and if the primary FE fails, routing data to a backup FE without interrupting active client connections. Additional steps could be: determining that a failed FE is recovered, updating a recovered FE; and updating the network such that new requests are routed to the recovered FE and re-routing packets for existing connections to the recovered FE as the primary FE, without interruption to clients.

The present invention includes a system and methods for developing a generic device which scales services presented by attached (directly or indirectly) servers. The generic device utilizes a switch to provide enhance scalability. In one example of this device, a distributed large scale TCP router is built using an ATM switch network. The scaled services can be presented as a single service to clients. These services can also be directly or remotely attached to the switch fabric. Some advantages are:

It has the highest capacity and throughput of any current approach to scaling Internet services. The capacity is equal to the capacity of the ATM network.

This approach includes the fault tolerance and high availability.

This approach does not have the restriction of forcing servers and a cluster server to be collocated on the same subnet.

Servers can be directly attached to the ATM fabric or attached via routed networks.

The switch fabric can be in a network or a highly scaleable parallel computer or any other application (telephone, . . . )

BRIEF DESCRIPTION OF THE DRAWINGS

These and other improvements are set forth in the following detailed description. For a better understanding of the invention with advantages and features, refer to the description, claims and to the appended drawings, wherein:

DETAILED DESCRIPTION

Figure 1:
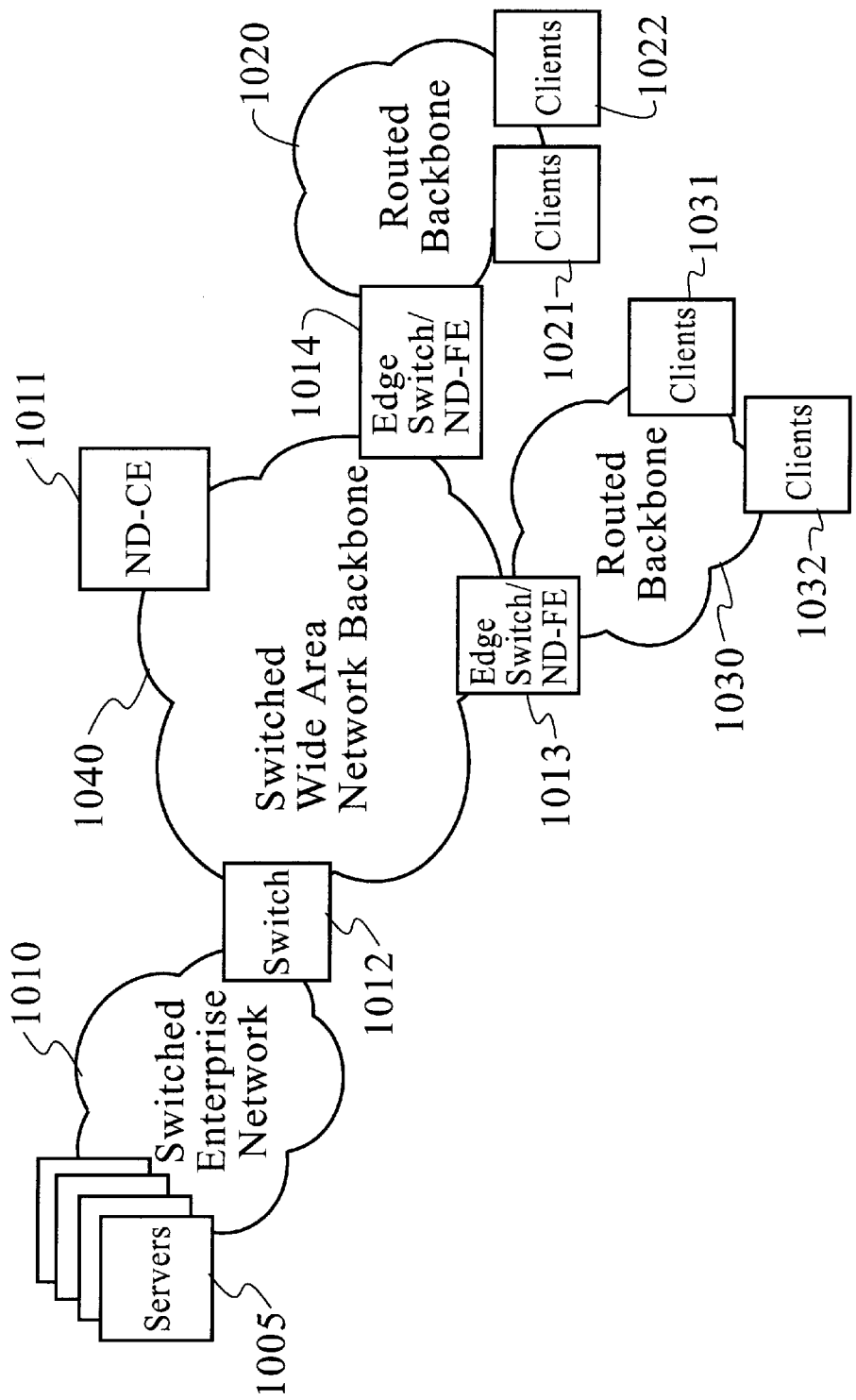
FIG. 1 depicts an example of the present invention deployed in a switched Network.

FIG. 1 depicts an example of the present invention deployed in a switched Network including a switched technology. In general, a switched wide area network backbone 1040 is a conventional Wide Area Network (WAN) implemented with any switch technology, including but not limited to: Frame Relay; ATM; or X.25. Similarly, a switched enterprise network 1010 is a conventional enterprise network implemented with any switch technology such as Frame Relay, ATM, or X.25. As is conventional, a backbone network is any network that forms the central interconnect for an internet. A national backbone is generally a WAN; a corporate backbone is usually a LAN (local area network) or a set of LANs.

The present invention preferably includes well known network dispatcher (ND) logic, which is a software router of TCP connections which also supports load balancing across multiple TCP servers. Those skilled in the art will appreciate however that any TCP connection router and/or load balancing logic can be adaptable to the present invention. As depicted, the present invention includes two entities: a Network Dispatcher Control Engine (ND-CE) 1011; and a Network Dispatcher Forwarding Engine (ND-FE) 1013, 1014. The ND-CE 1011 is in charge of assigning a connection to a server 1005 and forwarding information about the assigned server and connection to the ND-FE 1013 or 1014. Each ND-FE 1013, 1014 applies the assignments received from the ND-CE 1011 to map a TCP connection onto a switched (for example ATM) connection. Ultimately, the ND-FE communicates a connection termination event back to the ND-CE 1011. Those skilled in the art will appreciate that this method is independent of the protocol used to propagate the information between ND-CE 1011 and the ND-FE 1013, 1014, as well as independent of the physical locations of these functions.

The forwarding engine (FE) can be at any place in the network, up to the two extremes:

1. In the client: so that a TCP connection is switched entirely from client to server. This approach, which is the most efficient, requires the clients to be directly connected to a switched network (1040 or 1010) (a more detailed example will be described with reference to FIG. 4). In general however, the Clients (1031, 1932, 1021, 1022) do not have to be directly connected via a switched network, they can be connected to the Internet using any technology.

2. At same location as the control engine: A set of clustered ND-FE and the ND-CE can be connected through a conventional switch fabric or an enterprise switch network 1010. This solution has the advantage of not changing the client and the WAN backbone. However, if the WAN backbone is a switched network 1040, this approach will not take full advantage of the switched WAN backbone 1040. Nevertheless, this approach still allows the distribution of the forwarding engine 1014, while taking advantage of the enterprise switched network 1010 (between the merged ND-FE/ND-CE and the servers 1005). An example of a merged ND-CE and ND-FE will be described with reference to FIG. 3.

In a preferred TCP connection router embodiment, the FE includes an executor process and the CE includes an executor and a manager, for example as adapted from ND. The executor can be an OS kernel extension that supports fast IP packet forwarding while the manager is a user level process that controls the executor. This new implementation allows the FE with its executor to be distributed to the edge of a switch or switched network, thus providing improved performance and robustness. The FE can distribute connections under the direction of the CE either synchronously or asynchronously. Host metrics can also communicate with the CE in the same way as they communicated before. High availability and fault tolerance can be accomplished by having at least two CEs in the network, one designated as primary and the other as secondary. Communications between the two CEs can use known techniques. The difference is that, because of the distributed FEs, additional state would have to be transferred between the primary and the backup.

Unlike conventional network dispatchers or routers, the present invention can use topology, rate, link speed, and other information contained in the switch network to route client requests to the servers. For example, on a Switched network, such as ATM, routing protocols, such as the Private Network to Network Interface (PNNI) distribute a large amount information to the switches, that can be used by the ND-CE and/or ND-FE to select an appropriate route to the appropriate server. When utilizing such routing protocols, the ND-CE and ND-FE have access to a potentially wide variety of relevant information about other switches, links between them and devices, that can be used make improved server selections. Examples of such useful information include: the end-to-end delay (up to the server); the jitter (delay variation to get to the server); the throughput to/from a server (average, peak, burstiness); and the propagation delay. This allows for a configurable metric to be a criteria for selecting an optimal server. These decisions can be made in the ND-CE 1011, which can also forward to the ND-FE 1013, 1014 its decision criteria, such as weights and conditions under which the ND-FE may use the criteria. Thus, the ND-FE can independently allocate connection requests to servers using the existing switch connections it has established. One skilled in the art will appreciate that a part of the ND-FE, which is a client of the ND-CE, would preferably receive this information and direct its use in the ND-FE.

Returning to FIG. 1, one or more clients 1021, 1022, are connected to the Switched Wide Area Network (SWAN) backbone 1040 via a routed backbone 1020 (also called routed network) and an Edge Switch/Network Dispatcher Forwarding Engine (ES/ND-FE) 1014. The Clients 1031, 1032 are connected to the SWAN backbone 1040 via the routed network 1030 and an ES/ND-FE 1013. The routed backbone (1020, 1030) is broadly defined as any backbone through which a client's request can be routed to the edge switch (1013 or 1014). A switched enterprise network 1010 is also connected to the SWAN backbone 1040, via a Switch 1012. A Network Dispatcher Control Engine, ND-CE 1011 is also connected to the SWAN backbone 1040. A cluster of servers 1005 is connected to the switched enterprise network 1010.

When the networks 1040 and 1010 are ATM networks, the Next Hop Resolution Protocol (NHRP) can be used in accordance with the present invention. The NHRP allows the establishment of so-called shortcut connections between endpoints not belonging to same subnet, bypassing any intermediate NBMA (non-broadcast multiple access) attached routers (not shown). The standard NHRP components include an NHRP Client (NHC) and an NHRP Server (NHS).

In this case, the ND-FE and the ND-CE may use a modified NHRP Client referenced as NHC++ (a standard NHC with additional functions that will be described below). In one embodiment, the ND-CE 1011 includes a modified NHRP Server referred to as NHS++ (a standard NHS with additional functions described below).

Specific extensions must be added in an NHRP implementation since the client sees only one target IP address (the virtual encapsulated cluster (VEC) address) although there are several possible targets in the cluster of servers 1005. So NHC++ and NHS++ functions (described below) must be provided in this case. The number of required specific devices should be minimized, to be able to support any customer configuration. To get full advantage of the shortcut connection, a preferred embodiment puts the NHC++ client in an ingress router to the SWAN 1040 and the NHS++ function at least in the ND-CE 1011. All that is needed in the routers on the path from the WAN ingress NHC++ to the ND-CE/NHS++ is the support of NHS. Similarly, all that is needed in the routers on the path from ND-CE/NHS++ to the NHC++ in the target servers is the support of NHS (as will be described with reference to FIG. 7). Note that the enterprise router (the WAN egress one) need not have the NHS++ function.

Figure 2:
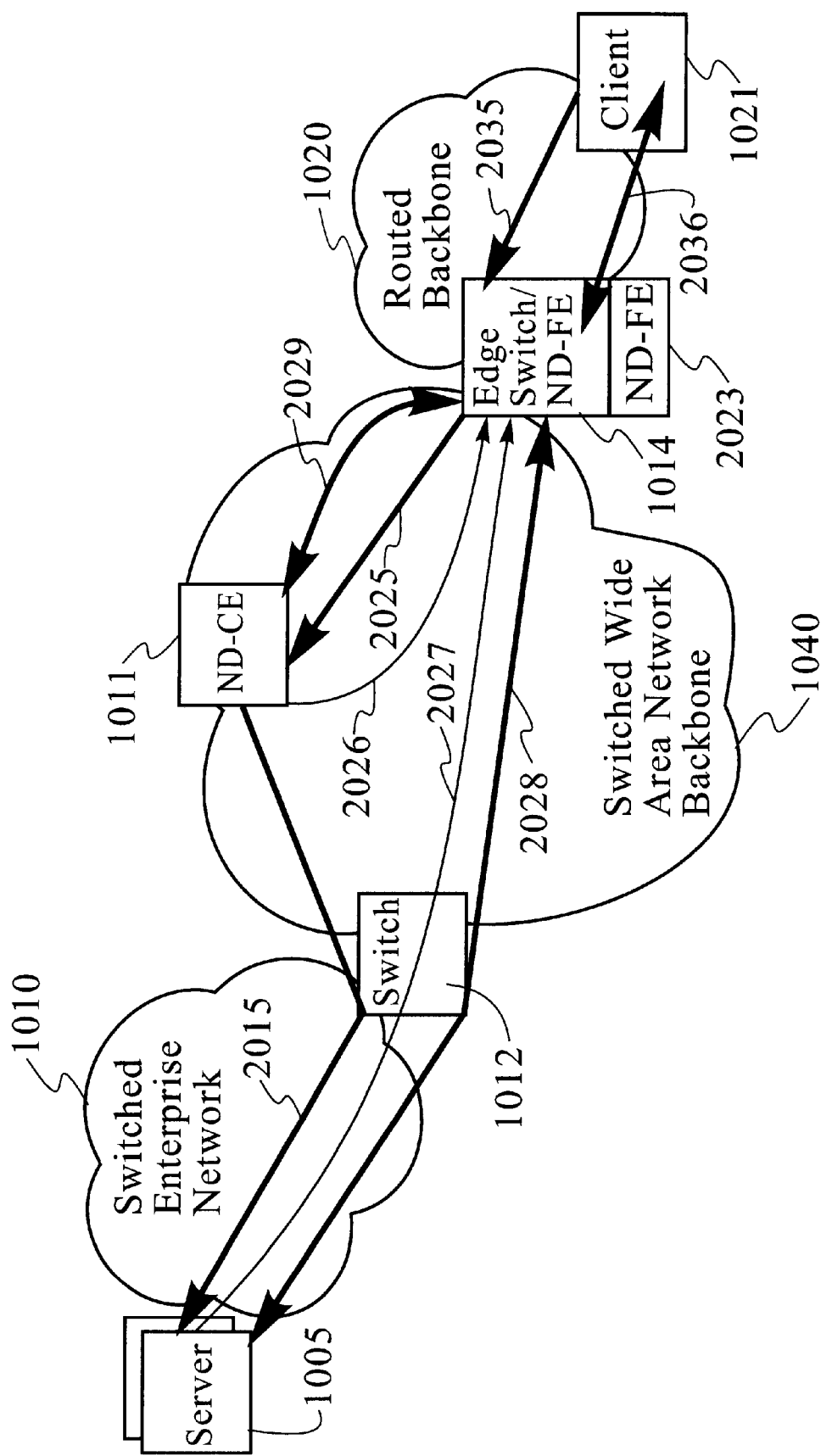
FIG. 2 depicts an example of a logic flow to set up a switched path.

FIG. 2 shows an example of a logic flow to set up a switched path between a client and a server in accordance with the present invention. As depicted, a client 1021 issues a request 2035 to obtain TCP service from a cluster of servers 1005. The request 2035 eventually reaches an Edge switch 1014, on the border of the Switched Wide Area Network backbone 1040. The Edge Switch 1014 also contains a Network Dispatcher Forwarding Engine (ND-FE) 2023. The ND-FE 2023 performs a standard table lookup to determine whether or not the request is part of an existing connection. If the request is part of an existing connection, the ND-FE 2023 retrieves the corresponding switched connection and forwards (2028) the client request over the existing switched connection straight to a server in the cluster 1005 (via the switched network 1040, the switch 1012 and the switched enterprise network 1010). If there is no preexisting connection, the ND-FE 2023 forwards the client request 2025 to the Network Dispatcher Control Engine ND-CE 1011. The ND-CE 1011 selects a server in the cluster 1005 and returns (2026) the selected server's switched address to the ND-FE 2023. In addition, the ND-CE 1011, can forward to the ND-FE 2023 its decision criteria (such as weights) and the conditions under which the ND-FE 2023 may use these criteria. The ND-FE 2023 can use the criteria to independently allocate connection requests to servers 1005 using the existing switch connections it has established. The ND-CE 1011 preferably also gives the ND-FE 2023 information on how long it should retain switched paths to servers after they have become idle. This additional information can be sent using the same flow (2026), or separately (2029).

Returning to the connection setup, the ND-CE 1011 also forwards (2015) the initial client request to the server in the cluster 1005, via the switched network 1040, the switch 1012 and the switched enterprise network 1010. Once the ND-FE 2023 receives the selected server switched address, it will establish 2027 a switched connection 2028 to the selected server. If a switch connection already exists (2028), it will preferably reuse the existing (2028) connection instead of establishing (2027) a new one. After the connection is established (new or existing) the ND-FE 2023 will forward any subsequent packet 2036 of the client connection on the established switched connection 2028 to the server 1005, via switched network 1040, the switch 1012 and the switched network 1010.

When the client 1021 terminates the connection to the server 1005, the ND-FE 2023 marks the connection for removal, and either: forwards (2025) a connection termination packet and any subsequent packet for that connection to the ND-CE 1011; or it forwards the connection termination packet to the server 1005, and after the connection has terminated, separately informs (2029) the ND-CE 1011 of the termination of the connection. When the connection termination packet and subsequent packets are being forwarded (2025) to the ND-CE 1011, the ND-CE 1011 marks the connection for removal, and forwards (2015) the packet to the associated server. The ND-CE 1011 removes the connection when it has been idle for an amount of time, which is preferably configurable. When the ND-FE 2023 separately informs (2029) the ND-CE 1011 of connection termination, the ND-CE 1011 will simply remove the connection from its connection table. Upon termination of a connection, the switched connection between the Edge switch 1014 and the server 1005 is kept so that additional connections directed to the same server from the same ND-FE 2023 will be able to reuse it. After a configurable period of time without any client connections requesting that server, the corresponding switch connection 2028 may be removed.

Figure 3:
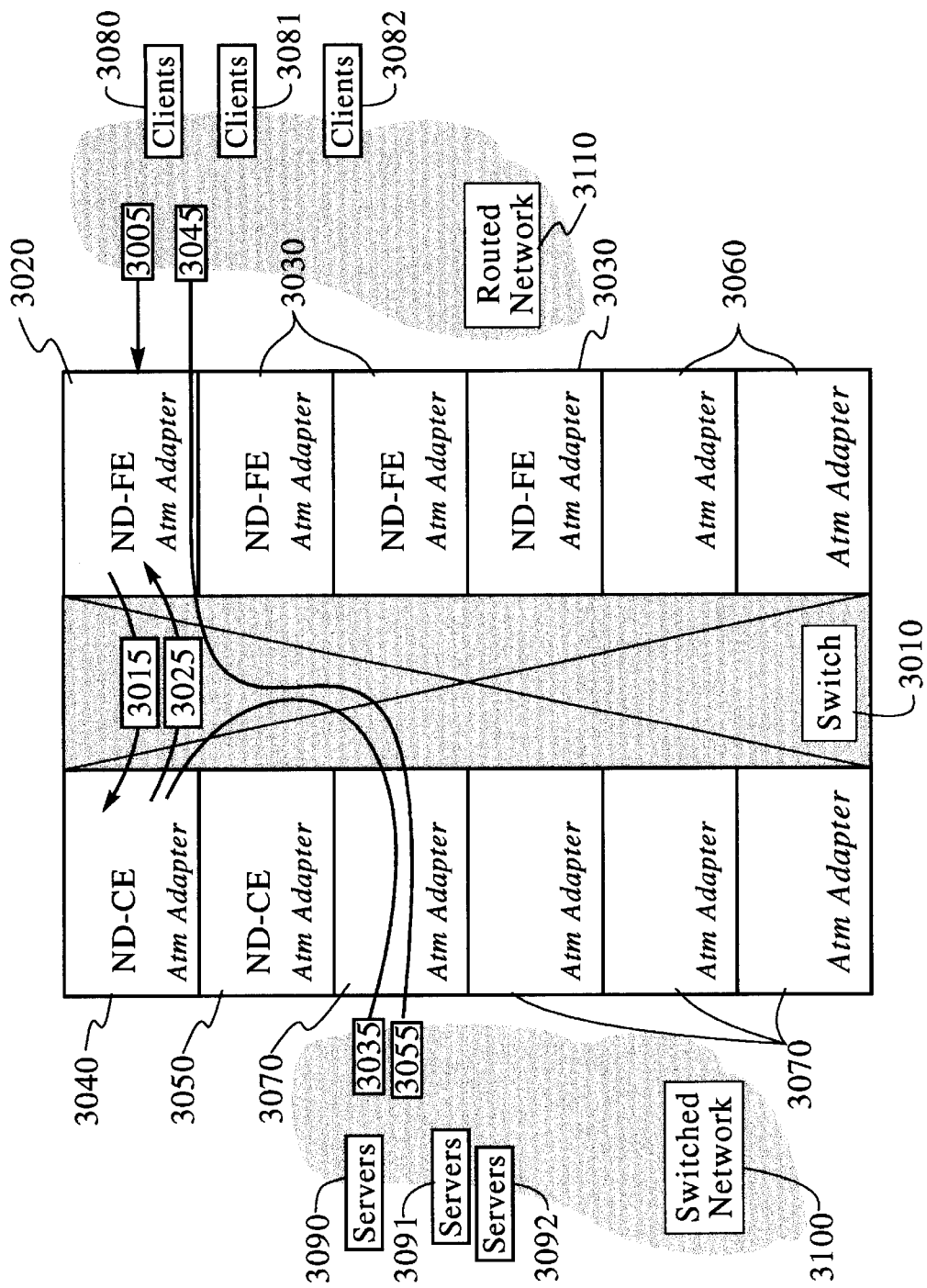
FIG. 3 depicts an example of a control engine (CE) and a forwarding engine (FE) merged into a single switch.

FIG. 3 shows an example of a ND-FE, ND-CE, Edge Switch and Switch to Enterprise Backbone collapsed into the same physical box or apparatus. As depicted, Clients 3080, 3081, 3082 can access a cluster of servers 3090, 3091, 3092 via a routed network 3110, a ND-CE-FE-Switch 3010 and a switched network 3100. An initial request 3005, from a client 3080, reaches a ND-FE 3020. The ND-FE 3020, after an unsuccessful lookup in its connection table, forwards (3015) the initial client request 3005 to the ND-CE 3040. The ND-CE 3040 responds (3025) to the ND-FE 3020 with the switched address of a selected server 3090 from the cluster. It also forwards (3035) the initial client request 3005 to the selected server 3090. Any subsequent packet 3045 issued by the client 3080 on the same client connection are routed from the client 3080 to the ND-FE 3020, and switched (3055) from the ND-FE 3020 to the selected server 3090. Termination flows are similar to those discussed in FIG. 2.

Figure 4:
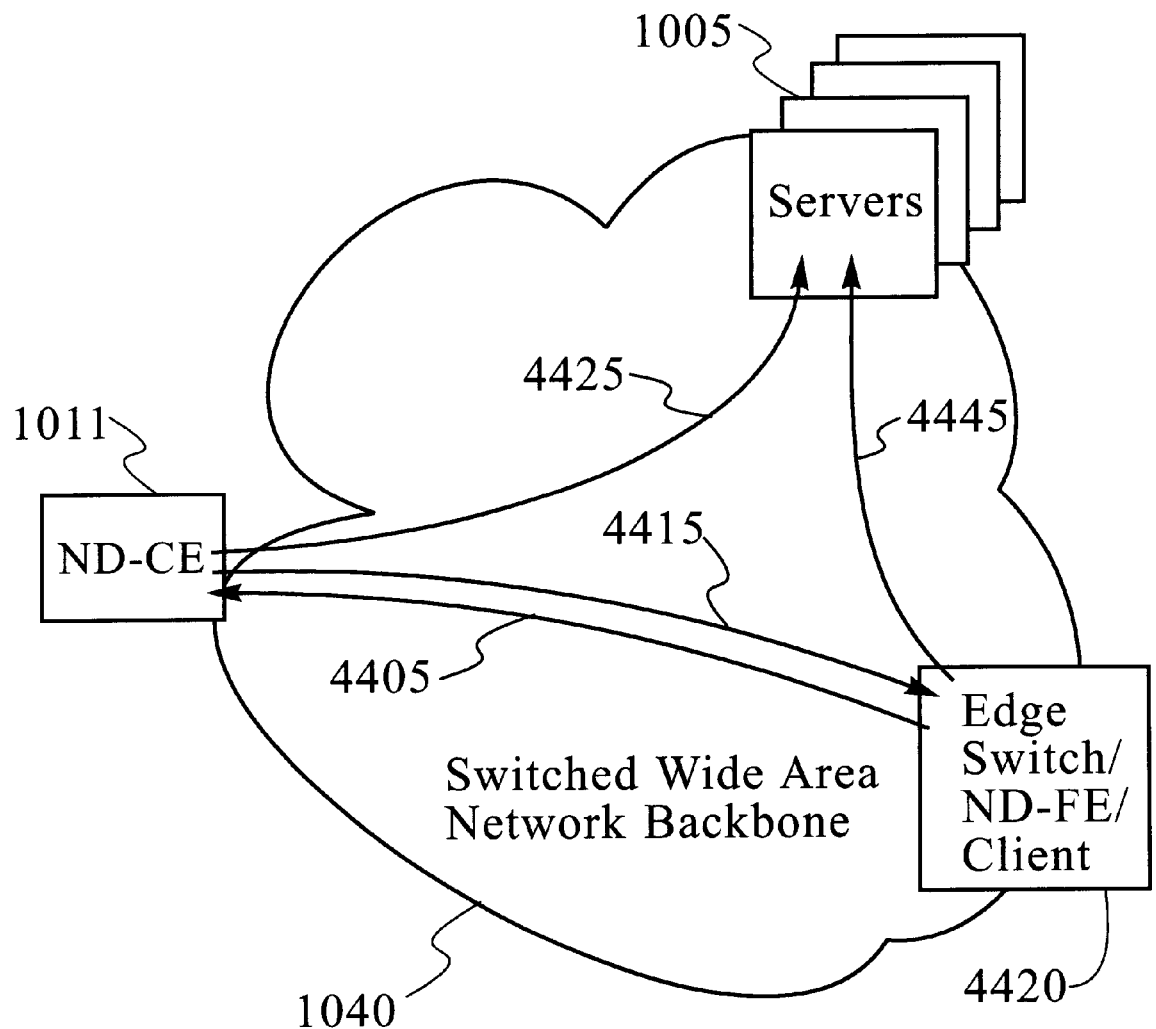
FIG. 4 depicts an example of the FE merged with the client.

FIG. 4 depicts an example of the ND-FE 1014 and a client 1021 of FIG. 1 merged, resulting in a merged client/ND-FE 4420. As depicted, when the client/ND-FE 4420 issues a new request, it goes immediately (4405) via the SWAN 1040 to the ND-CE 1011 which then returns (4415) the switched address of a selected server in the cluster 1005 to the client/ND-FE 4420. The ND-CE 1011 also forwards 4425 the request to the selected server 1005. After that initial exchange, all traffic for that connection is switched 4445 between client/ND-FE 4420 and selected server 1005 via the switched backbone 1040. Termination flows are similar to those discussed in FIG. 2.

Figure 5:
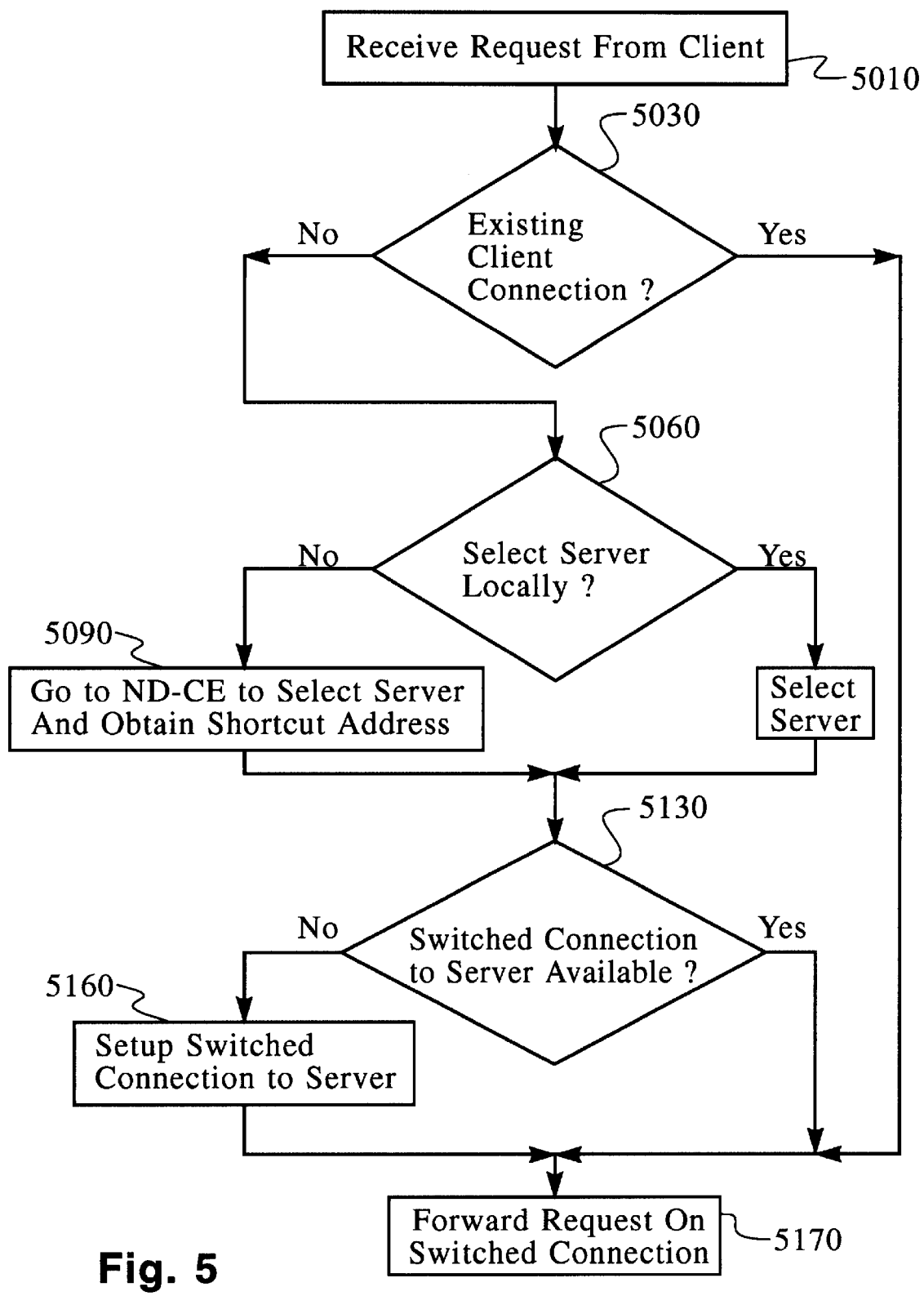
FIG. 5 depicts an example of a decision process in the FE.

FIG. 5 depicts an example of a logic flow used at an ND-FE to select a server and select or setup a switched path to it. In step 5010, the ND-FE 2023 (FIG. 2) receives a client request. In step 5030, it performs a table lookup to determine whether there is an existing connection to which this request belongs. If there is an existing connection, in step 5170 it simply forwards the request over the associated switched connection. If in step 5030, there is no existing connection then in step 5060 the ND-FE 2023 checks whether is can select the destination server locally or whether it must go to the ND-CE 1011 (FIG. 2). This decision is preferably made using a configurable function and data provided by the ND-CE 1011 on a previous flow (2029—described in FIG. 2). If the ND-FE 2023 can select the server locally, in step 5100 it selects a server. If in step 5060 the ND-FE 2023 cannot select the server locally, in step 5090, the ND-FE 2023 interrogates (2025 in FIG. 2) the ND-CE 1011 to obtain a server selection and a corresponding switched address. Once a server has been selected either locally, or by the ND-CE 1011, the process continues at step 5130. In step 5130, the ND-FE 2023 checks whether there is an existing switched connection to the selected server. If there is a switched connection, in step 5170, it forwards (2028 in FIG.

2) the request over the existing switched connection. If there is no existing switched connection to the selected server, in step 5160 the ND-FE sets up a switched connection to the selected server. When this is done, in step 5170 it forwards the client request over the new switched (2027 in FIG. 2) connection.

FIGS. 6 through 12 depict an example of the present invention using NHRP protocols between the ND-CE and the ND-FE to let the ND-FE know the assigned server so that it can map a TCP connection onto a switched (ATM) connection. Part of this invention uses known features of NHRP in regards to the path between the ND-FE, ND-CE, and the servers and on the servers. One skilled in the art will appreciate that the present invention can be readily implemented on other types of switches or switched networks. All the flows used in the preferred embodiment are standard NHRP flows. NHRP allows for extension fields, which are preferably utilized to implement additional function. Consequently all errors related to the flows are advantageously handled using techniques known to the art.

Figure 6:
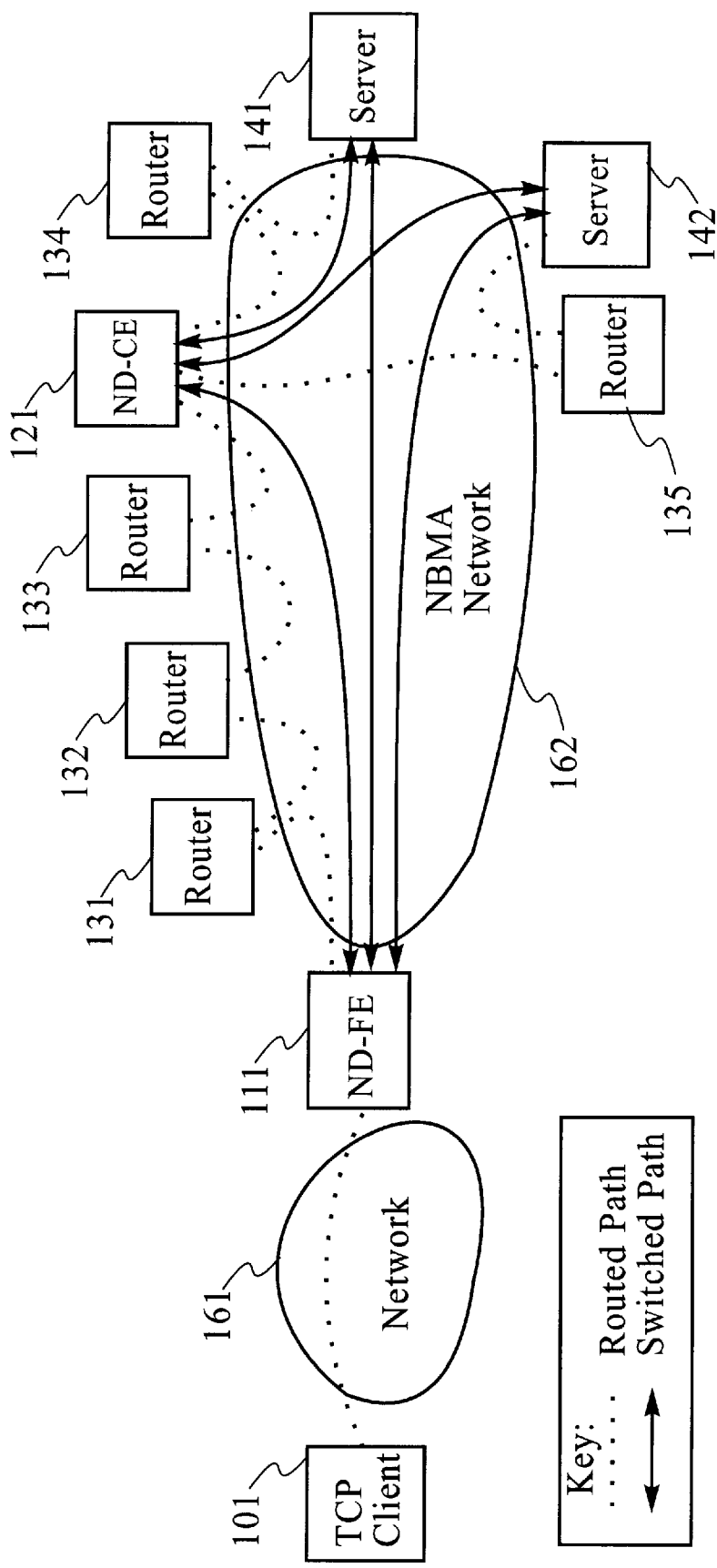
FIG. 6 depicts an example Network Topology using the Next Hop Resolution Protocol (NHRP)

FIG. 6 depicts an example of a network topology where the present invention may be deployed. A TCP Client (101) is an IP host that needs to use the services of a cluster of servers including servers 141 and 142. The client has to establish a TCP connection with an application on one of the servers (141 or 142). For this example, assume that the IP address of the cluster is IP_SC. The TCP Client only knows a cluster IP address, IP_SC and a TCP port number. The servers are located across a Non-Broadcast Multiple Access (NBMA) network (162). In this Figure and the following Figures a switched connection over the NBMA network will be called an NBMA connection. As noted, although the network 162 is an ATM network, one skilled will appreciate that this invention can be implemented on other types of switched networks.

Conventionally, IP datagrams sent by Client 101 to one of the servers 141 or 142 normally follows a routed path, illustrated by the dotted lines. This routed path crosses several intermediate routers: 111, 131, 132, 133, 121, and 134 for server 141; and routers 111, 131, 132, 133, 121, and 135 for server 142.

According to the present invention, a short-cut ATM connection is established across the network (162) for the duration of a TCP connection, so that the number of intermediate hops is minimized.

Two of the intermediate routers, 111 and 121, have been adapted in accordance with the present invention: Router 111 includes a Network Dispatcher Forwarding Engine (ND-FE). It establishes short-cut connections with the servers. It also forwards datagrams from the TCP Client onto the short-cut connections. Router 121 includes a Network Dispatcher Control Engine (ND-CE). It assigns a server for each new TCP connection.

The following flows are from the "Next Hop Routing Protocol" (NHRP) being standardized by the Internet Engineering Task Force (IETF). The NHRP components include a NHRP Client (NHC) and a NHRP Server (NHS), both of which are known to the art. The ND-FE (111) and the ND-CE (121) use a modified NHRP Client referenced as NHC++ (a standard NHC with additional functions described below). A Router 133 also includes a modified NHRP Server referred to as NHS++ (a standard NHS with additional functions described below). The number of required specific devices should be minimized to be able to support any configuration. All that is needed in the routers 131, 132 on the path from the WAN ingress NHC++111 to the NHS++133 which serves the ND-CE 121 is support of NHS.

A preferred embodiment,—to get full advantage of the shortcut connection—is to put the NHC++ client in the ingress router 111 to the WAN and the NHS++ function at least in the ND-CE 121 (instead of the router 133). In this case the router 133 should also support NHS.

Similarly, all that is needed in any routers (there are none illustrated in FIG. 6, however there could be one or more routers between the router 134 and the server 141) on the path from NHS++ (133) which serves the ND-CE to an NHC in the target servers 141, 142 is the support of NHS (as will be described in FIG. 7). Note that the enterprise router 111 (the WAN egress one) need not have the NHS++ function. Those skilled in the art will appreciate that the WAN ingress and egress router need not be the same router (although in this example they are).

Figure 7:
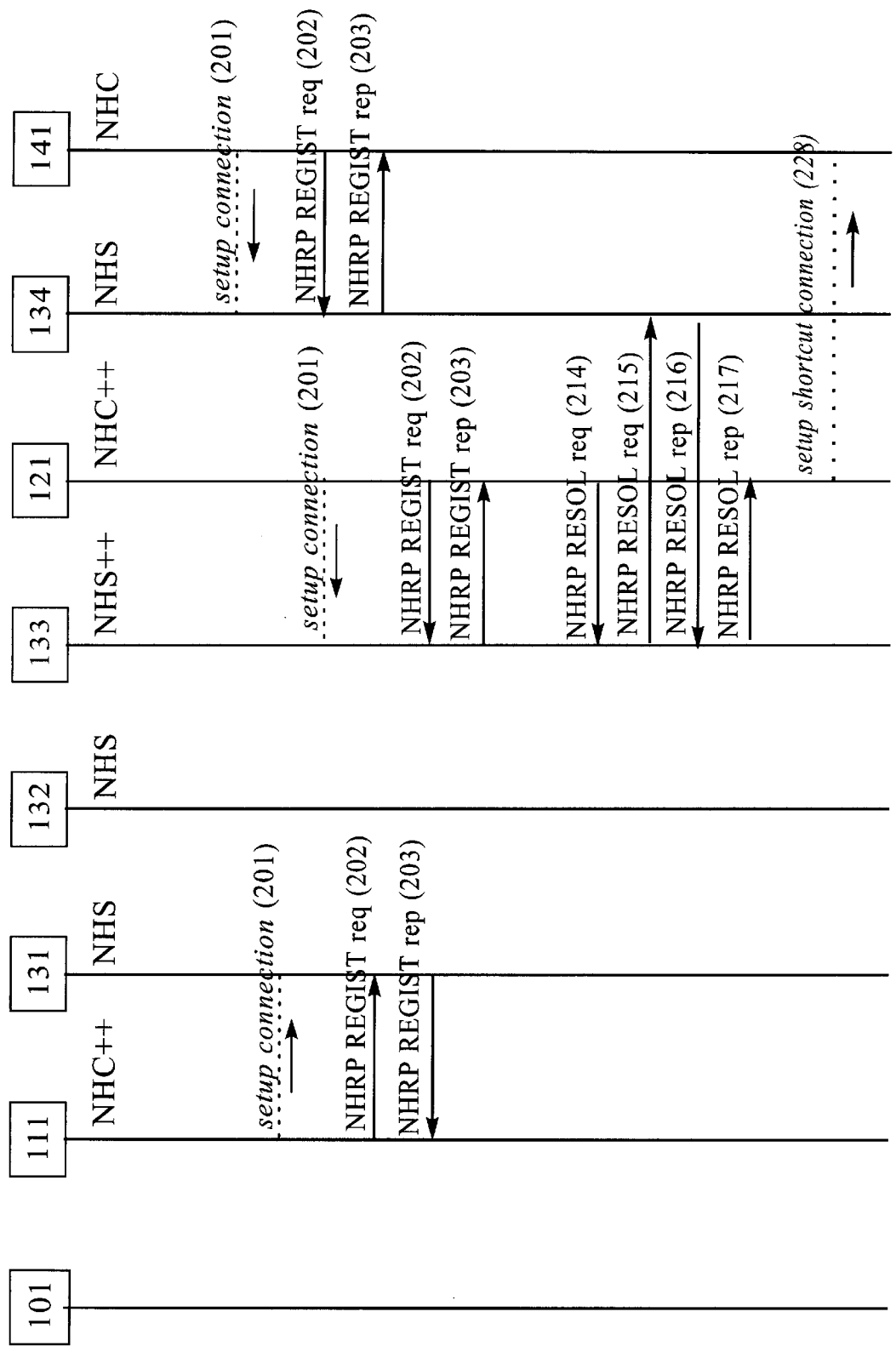
FIG. 7 depicts an example of NHRP initialization flows for the various components.

FIG. 7 depicts an example of an initialization flow for the network topology shown in FIG. 6.

Flow 201: Every NHC (111, 121, 141) initiates an NBMA connection setup to its respective owning NHS (131, 133, and 134). In this example, it is assumed that NHS 131 is the server for NHC 111; NHS 133 is the server for NHC++121; and NHS 134 is the server for NHC 141. The relative locations of an NHC and its serving NHS have no impact on the principles of the present invention.

Flow 202: After flow 201 is complete, every NHC (111, 121, 141) registers (NHRP REGIST) both its own protocol address and its own hardware address to its respective serving NHS (131, 133, and 134). For example, the ND-CE 121 registers the IP address of the server cluster along with its own ATM address.

Flow 203: When the address registration completes, the NHS 131, 133, or 134 sends a positive reply to its client.

Flow 214: The ND-CE 121 uses an NBMA connection with every host in the server cluster to forward initial packets received on the routed path. For every host it sends an authoritative resolution request (NHRP RESOL) to its serving NHS 133. The resolution request specifies the IP address of the destination host (e.g., IP1 for server 141). In this example, the initialization flows 214 through 228 are described for one server of the cluster. These flows must be executed for every server.

Flow 215: NHS 133 forwards the resolution request to its neighbor NHS. Using techniques know to the art, the request reaches the NHS owning the requested IP address e.g., for IP1, NHS 134.

Flow 216: NHS 134 sends a resolution reply containing the hardware address of 141 to the originator of the request.

Flow 217: Using techniques know in the art, the resolution reply reaches the request originator, i.e., the ND-CE (121).

Flow 228: The ND-CE (121) now establishes an ATM shortcut connection with the server 141.

Figure 8:
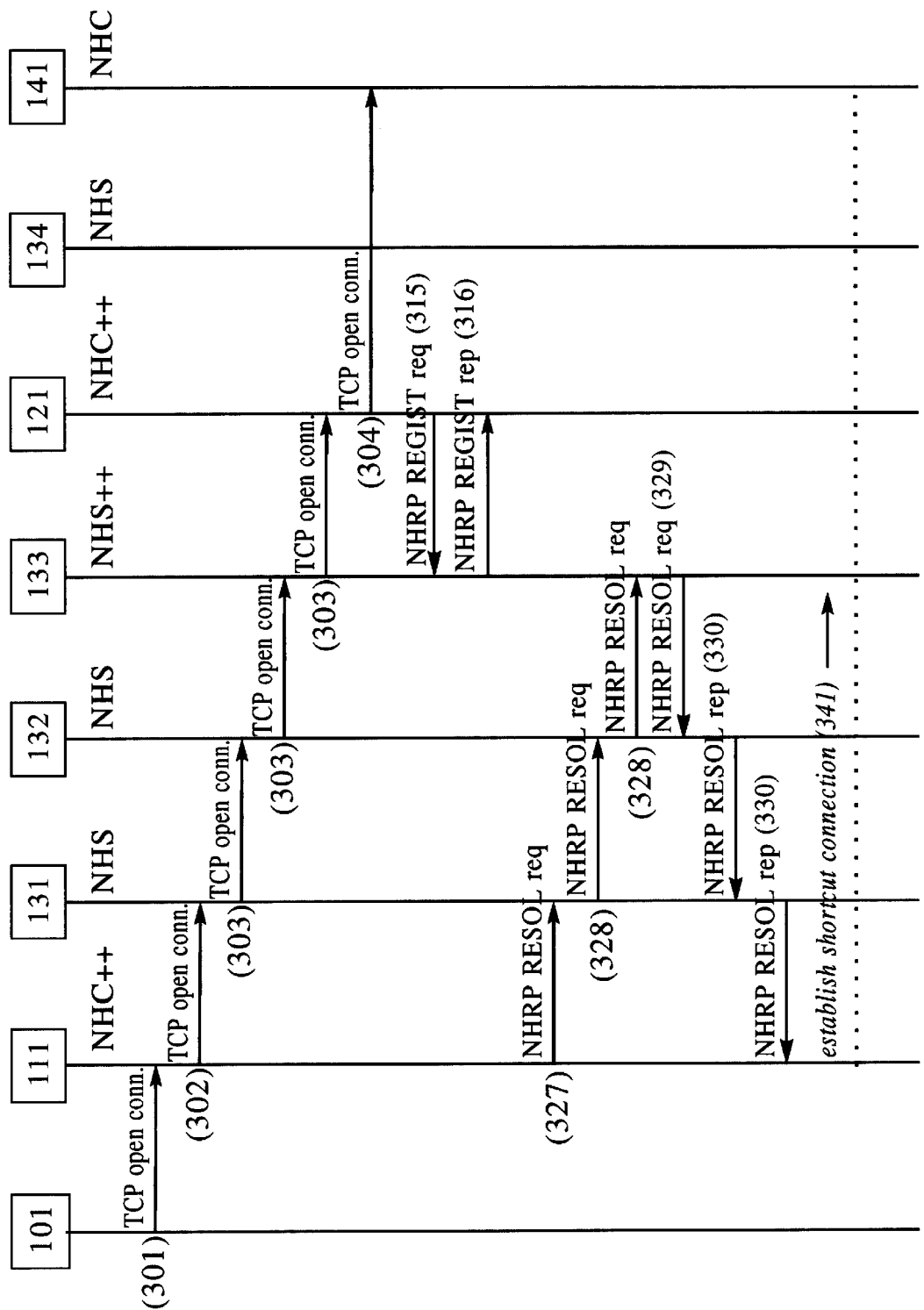
FIG. 8 depicts an example of client to server logic flows for a TCP Connection Setup.

FIG. 8 depicts an example of the processing of an IP data gram sent by a TCP client 101 (FIG. 6) to establish a TCP connection with a cluster which includes servers 141 and 142. This example describes the logic flow when the ND-FE is not locally selecting servers. As described above, when the ND-FE locally selects servers it reuses NBMA connections and consequently these flows are not necessary.

Flow 301: The TCP client 101 sends an IP datagram requesting a new TCP connection (TCP open connection). The destination IP address of the datagram is IP_SC, i.e., the address of the server cluster. The source IP address is the address of the TCP client (IP_CL). The TCP header contains a source TCP port number (P1) and a destination TCP port number (P2). The 4-tuple (IP_SC,IP_CL,P2, P1) (hereinafter called the "TCP connection key") uniquely identifies the TCP connection.

Flow 302: The IP datagram reaches the ND-FE (111). The ND-FE (111) looks in its "ND-FE cache table" for an entry matching the TCP connection key: (IP_SC,IP_CL,P2,P1). Since this is a new connection, there is no such entry in the table. The ND-FE (111) forwards the datagram on the default routed path 303 (represented by dotted lines in FIG. 6). It also creates a new entry in its "ND-FE cache table" for the new TCP connection key. No NBMA connection is currently associated with this TCP connection.

Flow 303: The IP datagram is forwarded by all routers along the routed path (131, 132, and 133).

Flow 304: The ND-CE (121) receives the IP datagram and looks in its cache table for an entry matching the TCP connection key: (IP_SC,IP_CL,P2,P1). Since this is a new connection, there is no such entry in the table. Based on the requested service—indicated by the TCP destination port P2—and the server loads or other information, the ND-CE (121) determines the best server in the cluster for the new TCP connection. Here, it is assumed that the selected server is server 141. Consequently, the ND-CE (121) forwards the IP datagram to server 141 on the previously established NBMA connection (flow 228). Whenever a new TCP connection is established with a server, the ND-CE (121) adds a new entry in its own TCP connection cache table, and starts an inactivity timer.

Flow 315: Since a new TCP connection is being established with the server 141, the ND-CE 121 registers the new TCP connection to its serving NHS 133 using a modified NHRP REGISTER request. The modified request contains a ND-CE specific extension field that specifies: the TCP connection key (IP_SC,IP_CL,P2,P1), and the hardware address of the designated server, i.e., the ATM address of server 141.

Flow 316: When the address registration completes, the NHS 133 sends a positive reply to its client 121.

Flow 327: After a brief delay, the ND-FE (111) sends a modified authoritative NHRP RESOLUTION request to its serving NHS (131). The modified request preferably contains a Network Dispatcher specific extension field that specifies the TCP connection key (IP_SC,IP_CL,P2,P1). The ND-FE will continue forwarding packets to the cluster using the routed path (flow 303) until this request is satisfied. If there is a negative response to this request, the ND-FE 111 will ask again.

Flow 328: The request is authoritative. Using techniques known to the art, the request is forwarded through the NBMA network 162 (FIG. 6) and reaches the NHS 133 owning the requested TCP connection key.

Flow 329: The NHS 133 searches for the TCP connection entry using the key (IP_SC,IP_CV,P2,P1) in its modified NHRP cache. If it finds the entry, it sends back a positive NHRP RESOLUTION reply that specifies the ATM address of the selected server 141. If the NHS 133 does not find an entry, it delays for a configurable amount of time to allow the NHC++/ND-CE 121 to send the NHRP REGISTER (flow 315). If the NHRP REGISTER is received before the delay expires, a positive NHRP RESOLUTION reply is sent, otherwise the NHS++133 sends a negative NHRP RESOLUTION reply (flow 316) to the request. Flow 330: Using techniques known to the art, the NHRP RESOLUTION reply reaches the requester ND-FE 111.

Flow 341: The ND-FE (111) saves the ATM address of server 141 in its "ND-FE cache table" along with the TCP connection key (IP_SC,IP_CL,P2,P1) and establishes a short-cut NBMA connection to the server 141. When the ATM connection is up, it saves its interface number and the standard ATM Virtual Path Indicator/Virtual Channel Indicator (VPI/VCI) value in the "ND-FE cache table." If a second IP datagram for the same TCP connection is received by the ND-FE 111 before the NBMA connection gets established, then the datagram is forwarded on the routed path.

Figure 9:
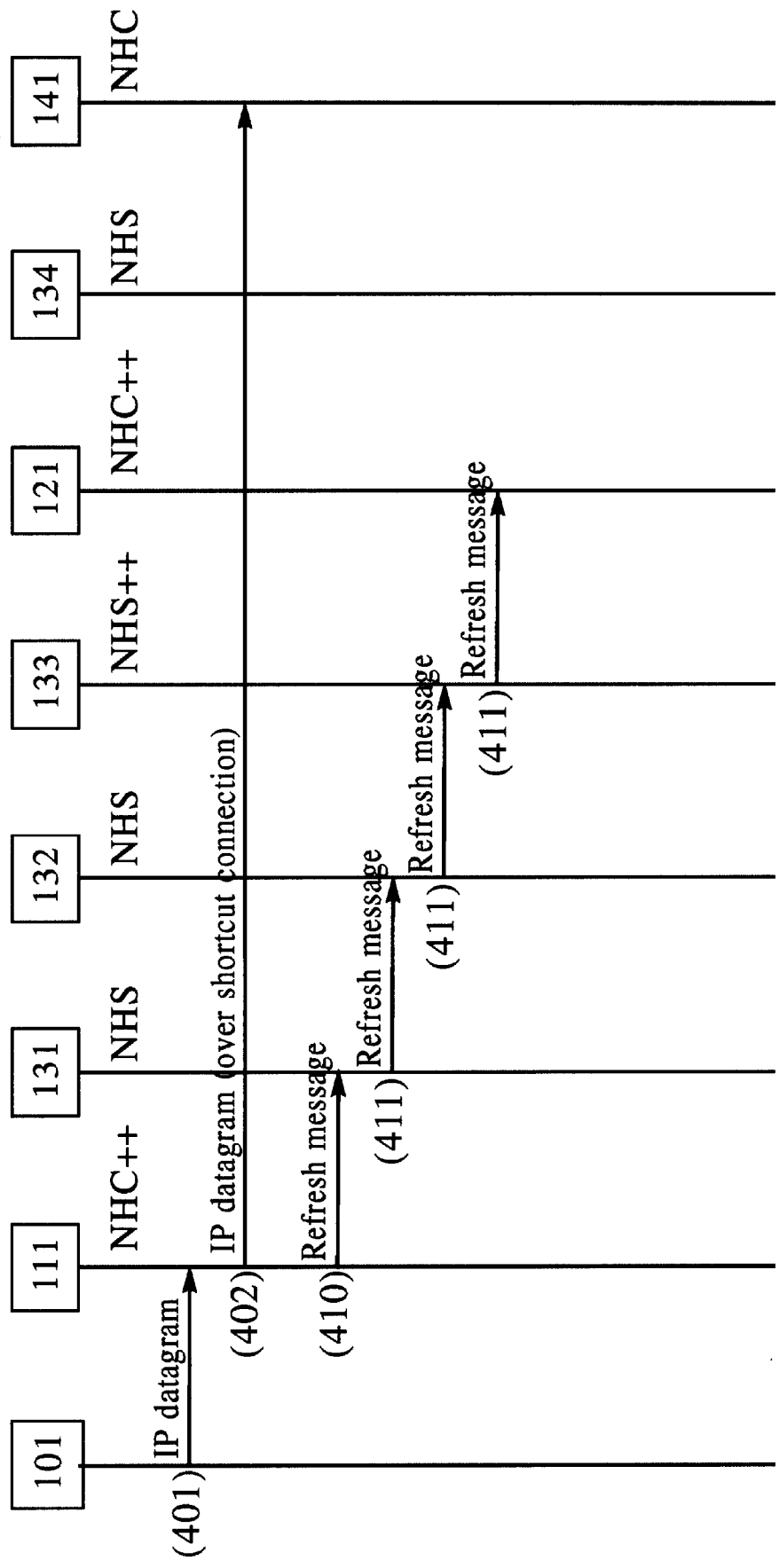
FIG. 9 depicts an example of client to server flows for TCP steady state.

FIG. 9 depicts an example of the use of short-cut NBMA connections by an ND-FE 111.

Flow 401: The TCP client 101 sends an IP datagram to the server cluster on the previously established TCP connection (IP_SC,IP_CL,P2,P1).

Flow 402: The ND-FE 111 receives the IP datagram. The ND-FE 111 looks in its "ND-FE cache table" for an entry matching the TCP connection key: (IP_SC,IP_CL,P2,P1) and finds that a shortcut ATM connection already exists. The ND-FE 111 sends the IP datagram directly to the server 141.

Flow 410: Periodically the ND-FE (111) sends a refresh message intended for the ND-CE 121 over the routed path. This message contains a list of active TCP connection keys. Refresh messages are preferably connectionless datagrams—e.g., using the User Datagram Protocol (UDP)—that do not need acknowledgments. The refresh period may be chosen large enough not to excessively increase the routed traffic. In fact, a value of one third of the duration of the ND-CE inactivity timer is sufficient.

Flow 411: The refresh message has a destination IP address equal to the server cluster IP address. Using techniques know to the art it reaches the ND-CE 121.

Figure 10:
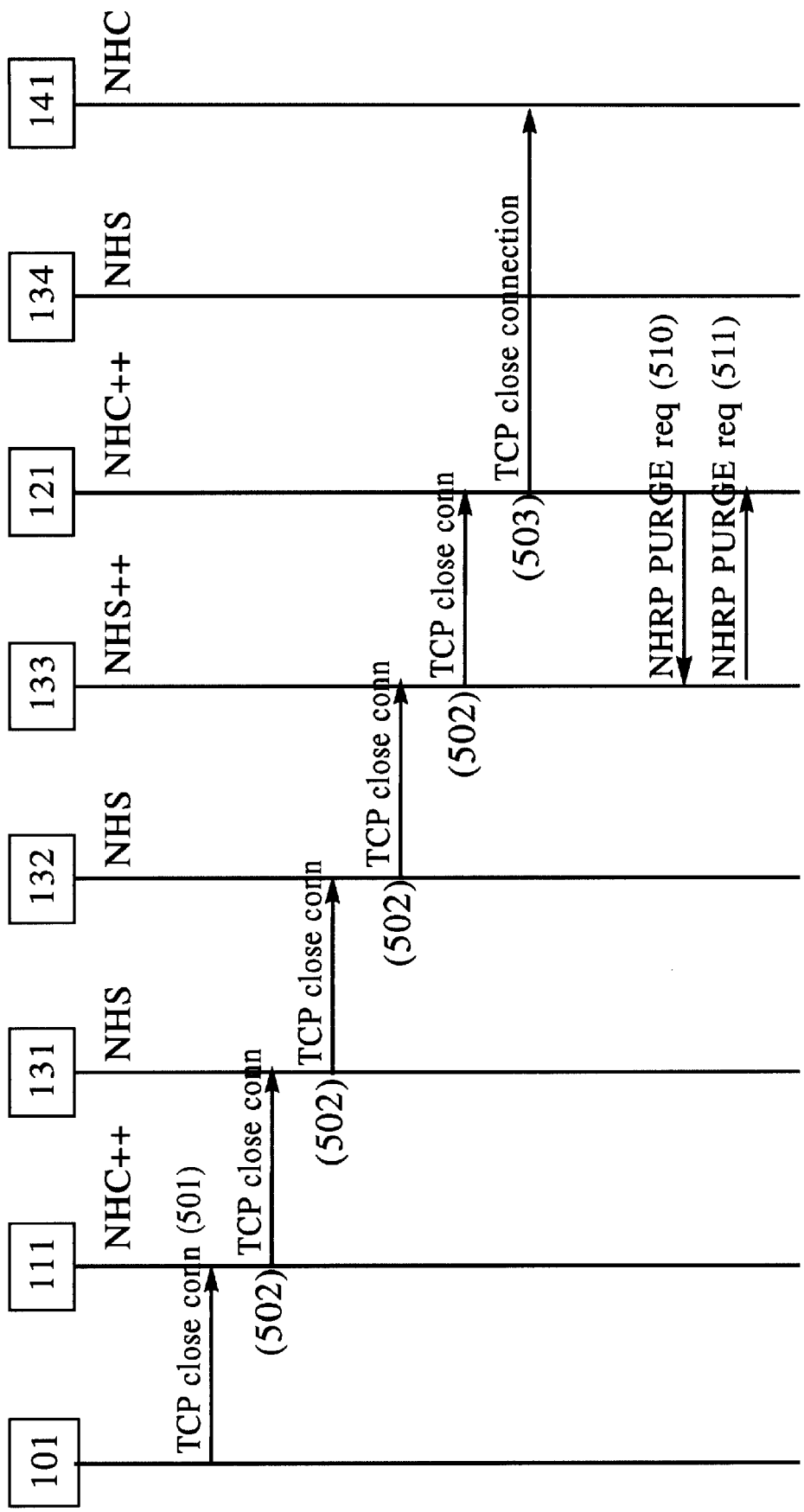
FIG. 10 depicts an example of client to server flows for TCP close connection.

FIG. 10 depicts an example of the processing of a TCP packet indicating that the TCP connection is being closed.

Flow 501: The TCP client 101 sends a TCP packet that indicates TCP connection termination. The ND-FE 111 receives the packet, extracts the TCP connection key (IP_SC,IP_CL,P2,P1), and looks in its "ND-FE cache table" for an entry matching the TCP connection key. It marks the state of the connection as "Closing"; forwards the packet on the routed path; and starts a timer. This timer specifies how long to wait after the last packet flows on the connection before purging the entry. Any subsequent packets for this connection are sent on the routed path so that the ND-CE 121 can maintain a similar timer. For proper operation, this timer should be greater than twice the Maximum Segment Lifetime (MSL). When the connection has been idle for the indicated amount of time, then the ND-FE 111 removes the corresponding entry from its ND-FE cache table.

Flow 502: The TCP packet destination address is IP_SC, the server cluster address. Thus the packet gets routed from router to router until it is received by the ND-CE (121). The ND-CE 121 extracts the TCP connection key, and retrieves the address of the corresponding server 141.

Flow 503: The ND-CE 121 forwards the TCP packet to the server 141 on the previously established ATM connection (flow 228). It marks the state of the TCP connection as "Closing", and starts a timer. This timer is also greater than twice the MSL TCP timer.

Flow 510: When the timer expires, then the ND-CE 121 removes the corresponding entry from its table. It also sends a modified NHRP PURGE request (e.g., containing the TCP connection key) to its serving NHS.

Flow 511: The NHS 133 removes TCP connection key from its internal table. It also replies by sending an NHRP PURGE reply to the requester 121.

Figure 11:
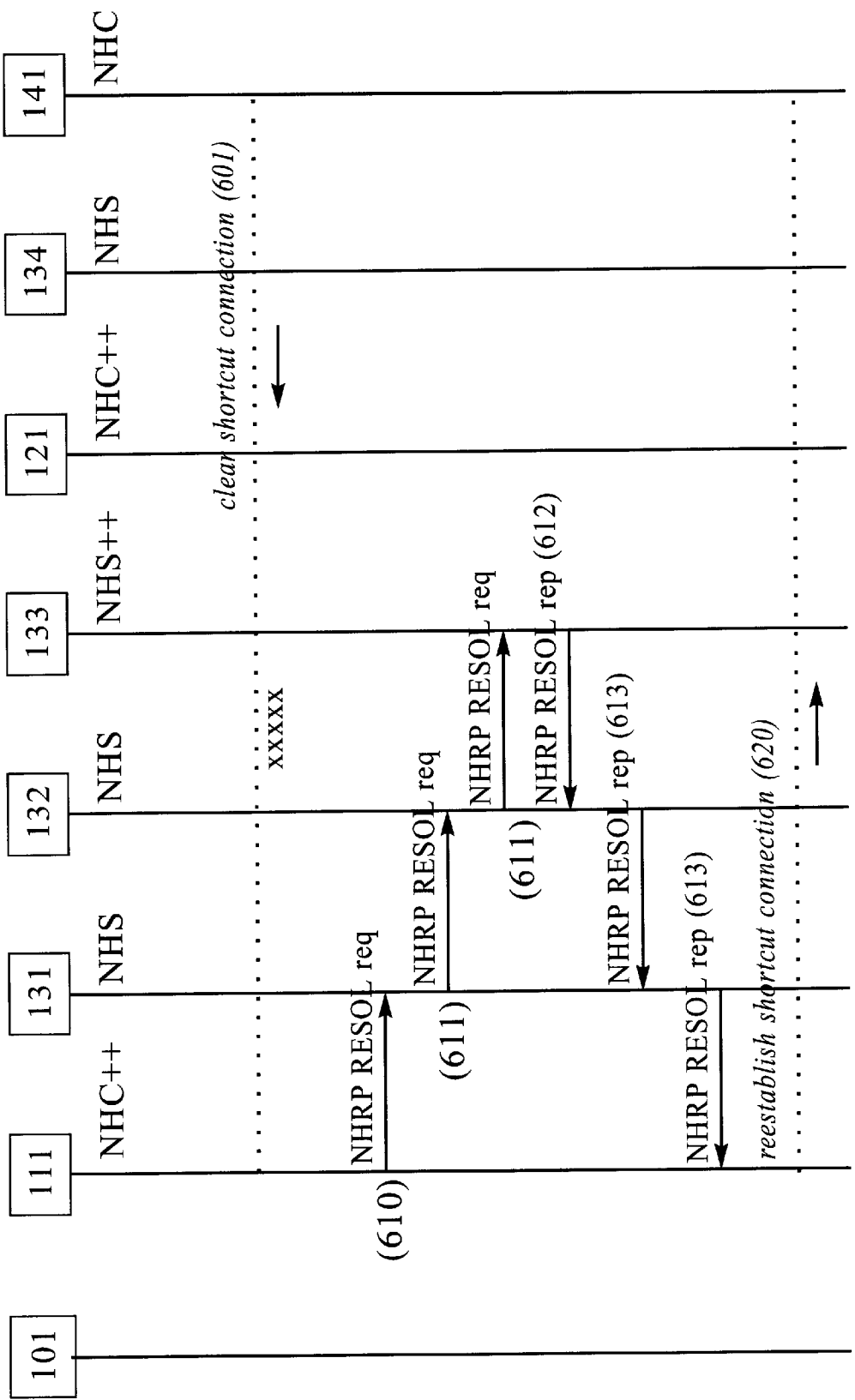
FIG. 11 depicts an example of client to server shortcut connection cleared by the server.

FIG. 11 depicts an example of the process for clearing a shortcut ATM connection by a server.

Flow 601: A shortcut ATM connection is cleared by the server 141. The server may voluntarily clear the shortcut connection for two reasons. Some timer has expired or its ATM address is changing. This request causes any packets that flow on conversations associated with the NBMA connection to be forwarded on the routed path until an NBMA connection is reestablished with the selected server.

Flow 610: If one or more TCP connection entries exist in the ND-FE 111 (in the "ND-FE cache table") associated with the NBMA connection being cleared, an NBMA connection will need to be reestablished. The server ATM address needs to be validated. A modified authoritative NHRP RESOLUTION (defined in FIG. 8 flow 327) request is sent to the NHS 131. To give time for the server 141 and the ND-CE 121 to reinitialize, the NHRP RESOLUTION reply preferably is not sent immediately after the ATM connection has been cleared, it is sent after a short delay.

Flow 611: The request is authoritative. The NHS 131 forwards the resolution request to its neighbor NHS 132. Using techniques known in the art, the request reaches the NHS 133 owning the requested TCP connection key.

Flow 612: The NHS 133 has found the TCP connection key (IP_SC,IP_CL,P2,P1) in its modified NHRP cache. The NHS 133 sends back a positive NHRP RESOLUTION reply that specifies the ATM address of the selected server 141.

Flow 613: Using techniques known in the art, the NHRP RESOLUTION reply reaches the request originator ND-FE 111.

Flow 620: ND-FE 111 reestablishes the ATM shortcut connection with server 141.

Figure 12:
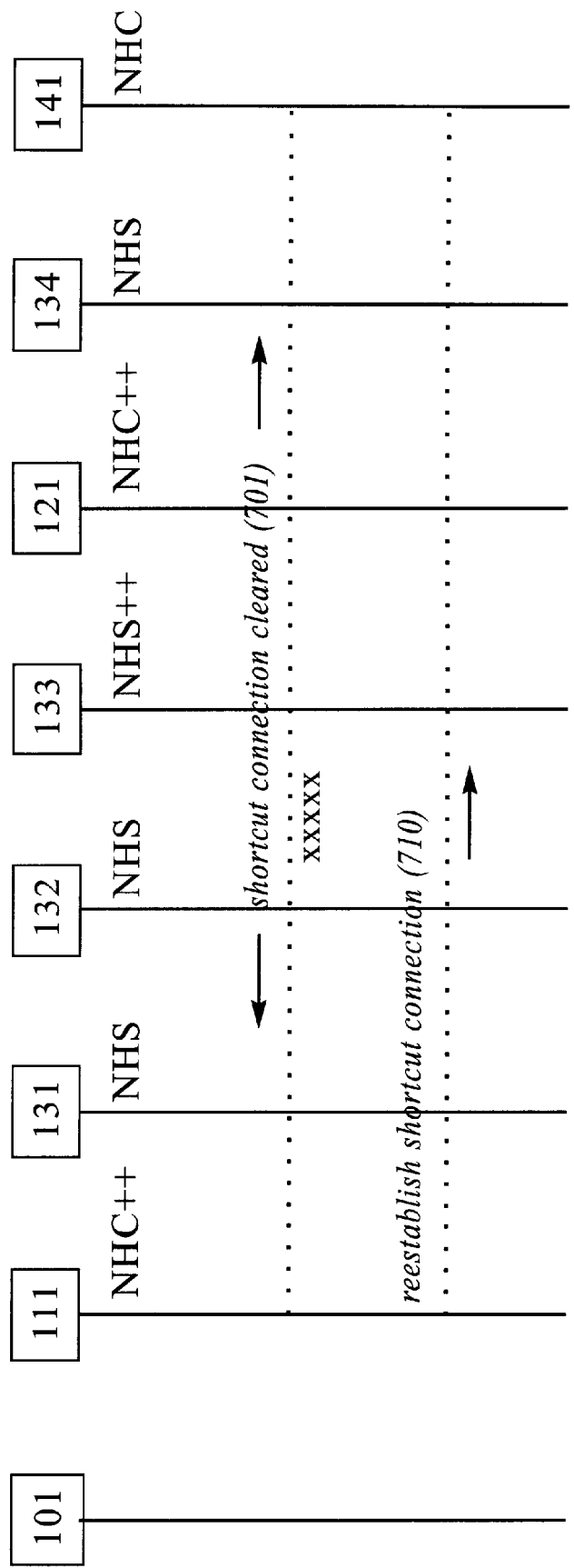
FIG. 12 depicts an example of a client to server shortcut connection cleared by the network

FIG. 12 depicts an example of a process for clearing an ATM shortcut connection by the network.

Flow 701. The shortcut ATM connection between the ND-FE 111 and a server 141 is cleared by the network. The ND-FE 111 marks the connection as being unusable by any entry in the ND-FE cache table. This causes all subsequent packets which would have used this connection to be forwarded on the routed path until an NBMA connection is reestablished with the selected server.

Flow 710: The ND-FE 111 attempts to reestablished the shortcut connection with the server 141.

High Availability and Fault-tolerance

FIG. 1 also depicts the high availability features of the present invention. There can be one or more ND-CEs inside of switched network 1040. These CEs will use the same cache coherency protocol as described above to keep their internal tables synchronized. When an ND-CE fails, the ND-CE which takes over for it informs all of the ND-FEs that it is the new controlling ND-CE.

ND-FE's fail independently of the ND-CE. If an ND-FE fails, only those clients (1021, 1022, 1031, or 1032) that are connected through the failing ND-FE are affected. In FIG. 1, clients 1021 and 1022 are connected through ND-FE 1014 and clients 1032 and 1031 are connected through ND-FE 1013. If the ND-FE 1013 fails, only those clients (1032 and 1031) which are connected through the backbone 1030 could be affected. If the backbone network through which the clients request are being routed to this invention (routed backbone) has only a single ND-FE 1013 through which it can route, then the failure of that FE will permanently disconnect those clients. To protect against this single point of failure, a second ND-FE can be configured to attach to this routed backbone 1030. Typically however, the routed backbones such as the Internet, will have multiple routes available. When a client connects, the routing information available in the network can be used to configure which other ND-FEs (or routes) (in order of priority) could be selected if the ND-FE 1013 fails. The primary and secondary ND-FEs can be configured as such using the priority selection information. A cache consistency protocol can be maintained between the primary ND-FE and the next two most likely ND-FEs to keep the connection table synchronized with the active ND-FE. The cache consistency protocol sends TCP connection keys and an identifier of the selected server to the backup ND-CEs. When a backup ND-CE receives a TCP connection key, a short cut is assigned and an entry is made in its connection table. If no short cut exists between the backup ND-FE and the selected server, one is established. One skilled in the art can use the previously defined flows to delay establishing this connection until the first packet is received. In FIG. 1, consider ND-FE 1013 as a primary ND-FE and ND-FE 1014 as a backup. The ND-FE 1014 connection table includes entries for all the clients connected through the ND-FE 1013 for which it is configured as the alternate. When the primary ND-FE 1013 fails, the backbone will route the packets to the configured alternate ND-FE.

Here, configuring an alternate refers to conventional techniques for network configuration such as routing tables. One skilled in the art will appreciate however that other configuration mechanisms are available. For example, methods are known for dynamically determining a network topology. This knowledge could then be used to configure the primary and backups.

Referring again to FIG. 5, for the forwarding decision logic, all connections, primary and backup are preferably represented in a same connection table.

When the primary ND-FE is repaired or recovers, as is conventional, it updates the network 1030 of its availability for routing. It will get cache updates from those FEs for which it is configured as a backup. As is conventional, as the network learns of the ND-FE's availability for routing, new connections will be routed to it automatically and packets for existing connections may be rerouted via the ND-FE without interruption to clients. The switch back to the primary ND-FE can be handled by standard protocols known in the art. Using Cache consistency protocols between the ND-FEs allows this invention to take advantage of the nature of packet switched networks.

The cache consistency protocol between the ND-FEs assures that the terminated active connections will be broadcast to ND-FEs that are backups. If the network is routing packets differently because of varying congestion conditions, a single client may appear to be active in two ND-FEs. At some point, the connection will be terminated and because each of those ND-FEs is a backup of the other, the termination will be replicated to the backup ND-FEs via the cache consistency protocol, causing the clients connection to be purged from the backup FEs.

Now that the invention has been described by way of a preferred embodiment, with alternatives, it is understood that those skilled in the art, both now and in the future, may make various equivalents, improvements and enhancements that fall within the scope of the appended claims. Accordingly, these claims should be construed to maintain the proper protection for the invention first disclosed.

We claim:

1. A method for selecting a server from a cluster of servers and a switched path to the selected server in a client-server system including a switched network, said method comprising the steps of:

receiving a client request at a forwarding engine (FE) from a client;

routing a server selection request by the FE to a control engine (CE) for selecting a server from the cluster of servers and a corresponding switched address for the server in response to receiving the client request;

selecting a server from the cluster of servers by the CE based on server selection criteria and communicating a corresponding switched address to the FE in response to the server selection request;

establishing a switched connection by the FE from the client to the selected server utilizing the corresponding switched address communicated by the CE; and forwarding by the FE data associated with the client request to the selected server over the established switched connection associated with the switched address without having the switched connection traverse the CE, wherein the FE is enabled to perform routing of a subsequent client request independently of the CE by one of: utilizing the established switched connection, and establishing a new switched connection based on a server selection criteria.

2. The method of claim 1, wherein the step of communicating the switched address to the FE comprises communicating server selection criteria to the FE and conditions under which the FE may use the criteria.

3. The method of claim 2, wherein the FE performs the following steps for the subsequent client request received at the FE:

determining if there is an existing switched connection associated with the subsequent client request; and forwarding the request over the existing switched connection if there is an existing switched connection associated the subsequent client request, and locally selecting a server from said cluster of servers based on the server selection criteria and establishing a new switched connection and forwarding the subsequent client request over the new switched connection if there is no existing switched connection associated with the subsequent client request.

4. The method of claim 3, wherein the step of establishing the switched connection further comprises the step of:

mapping a TCP connection onto a switched ATM connection based on the switched address.

5. The method of claim 4, further comprising the steps of:

providing a plurality of FEs that are remote to the CE and distributing the FEs to the edge of the switched network; and distributing TCP connections by each of said plurality of FEs under a direction of the CE.

6. The method of claim 4, further comprising the steps of:

providing a plurality of distributed FEs connected to the CE via a switch fabric; and mapping switched connections by each of said plurality of distributed FEs under the direction of the CE.

7. The method of claim 1, including a primary CE and a backup CE in the event that the primary CE fails, the method further comprising the steps of:

detecting the primary CE failing; and taking over for the primary CE by the backup CE and informing the FE that it is a new primary CE, in response to said detecting step.

8. The method of claim 1, including a plurality of FEs, the method further comprising the steps of:

using configuration information to configure one or more backup FEs that could be selected if a primary FE fails, in response to a client request; and routing data to a backup FE without interrupting active client connections if the primary FE fails.

9. The method of claim 8, further comprising the steps of:

determining that a failed FE is recovered and updating the recovered FE; and updating the network such that new requests are routed to the recovered FE and re-routing packets for existing connections to the recovered FE as the primary FE, without interruption to clients.

10. The method of claim 1, wherein a client is directly attached to the switched network and the client includes the FE.

11. The method of claim 1, wherein a client is attached to the switched network via an Internet.

12. The method of claim 1, wherein the CE further communicates to the FE a configurable function and additional data for retaining and utilizing a switched address that has become idle for subsequent client requests.

13. A system for selecting a server from a cluster of servers and a switched path to the selected server in a client-server system including a switched network, said system comprising:

a forwarding engine (FE) for receiving a client request and routing a server selection request to a control engine (CE) for selecting a server from the cluster of servers and a corresponding switched address in response to the client request;

the CE including a means for selecting a server from the cluster of servers based on server selection criteria and a means for communicating a corresponding switched address to the FE in response to the server selection request;

the FE including means for establishing a switched connection from the client to the selected server utilizing the corresponding switched address communicated by the CE; and the FE including a means for forwarding data associated with the client request to the selected server over the established switched connection associated with the switched address without having the switched connection traverse the CE, wherein the FE is enabled to perform routing of a subsequent client request independently of the CE by one of: utilizing the established switched connection, and establishing a new switched connection based on a server selection criteria.

14. The system of claim 13, wherein said means for communicating the switched address to the FE further comprises a means for communicating server selection criteria to the FE and for communicating conditions under which the FE may use the criteria.

15. The system of claim 14, wherein the FE further comprises:

a means for determining if there is an existing switched connection associated with the subsequent client request received at the FE; and a means for forwarding the request over the existing switched connection if there is an existing connection, and locally selecting a server from the cluster of servers based on the server selection criteria and establishing a new switched connection and forwarding the subsequent client request over the new switched connection if there is no existing switched connection associated with the subsequent client request.

16. The system of claim 15, wherein the means for establishing the switched connection further comprises:

a means for mapping a TCP connection onto a switched ATM connection based on the switched address.

17. The system of claim 16, further comprising a plurality of FEs that are distributed remotely to the CE at the edge of the switched network, wherein each of said plurality of FEs distributes TCP connections under the direction of the CE.

18. The system of claim 16, further comprising a plurality of distributed FEs connected to the CE via a switch fabric, wherein each of said distributed FEs maps switched connections under the direction of the CE.

19. The system of claim 18 wherein the FEs, CE and switch fabric are co-located in a single apparatus.

20. The system of claim 13, including a primary CE and a backup CE in the event that the primary CE fails, the system further comprising:
   a means for detecting the primary CE failing; and
   a CE means for taking over for the failing primary CE by the backup CE and informing the FE that it is a new primary CE, in response to said detecting step.

21. The system of claim 13, including a plurality of FEs, the system further comprising:
   a means for using configuration information available in the network to configure one or more backup FEs that could be selected if a primary FE fails, in response to the client request; and
   a means for routing data to a backup FE without interrupting active client connections if the primary FE fails.

22. The system of claim 21, further comprising:
   a means for determining that a failed FE is recovered and updating the recovered FE; and
   a means for updating the network such that new requests are routed to the recovered FE and re-routing packets for existing connections to the recovered FE as the primary FE, without interruption to clients.

23. The system of claim 13, wherein a client is directly attached to the switched network and the client includes the FE.

24. The system of claim 13, wherein a client is attached to the switched network via an Internet.

25. The system of claim 13, wherein the server is attachable via a routed network.

26. The system of claim 13, wherein the CE further comprises a means to communicate to the FE a configurable function and additional data for retaining and utilizing a switched address that has become idle for subsequent client requests.

* * * * *